(12) United States Patent
Kim et al.

(10) Patent No.: US 9,751,216 B2
(45) Date of Patent: Sep. 5, 2017

(54) ROBOT

(71) Applicants: Hong Won Kim, Seoul (KR); Woo Sup Han, Yongin-si (KR); Yong Jae Kim, Seoul (KR)

(72) Inventors: Hong Won Kim, Seoul (KR); Woo Sup Han, Yongin-si (KR); Yong Jae Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 310 days.

(21) Appl. No.: 14/471,706

(22) Filed: Aug. 28, 2014

(65) Prior Publication Data

US 2014/0366676 A1 Dec. 18, 2014

Related U.S. Application Data

(62) Division of application No. 12/654,531, filed on Dec. 22, 2009, now abandoned.

(30) Foreign Application Priority Data

Jan. 14, 2009 (KR) .......................... 10-2009-0002919

(51) Int. Cl.
*B25J 19/00* (2006.01)
*B25J 5/00* (2006.01)
(Continued)

(52) U.S. Cl.
CPC .............. *B25J 19/00* (2013.01); *B25J 5/007* (2013.01); *B25J 9/104* (2013.01); *B25J 18/00* (2013.01);
(Continued)

(58) Field of Classification Search
CPC . B25J 9/104; B25J 19/06; B25J 11/001; B25J 5/00; B25J 5/007
(Continued)

(56) References Cited

U.S. PATENT DOCUMENTS 3,190,286 A 6/1965 Stokes
4,347,837 A * 9/1982 Hosono .............. G02B 23/2476
356/241.4
(Continued)

FOREIGN PATENT DOCUMENTS

| JP | H09-254076 A | 9/1997 |
|----|--------------|--------|
| JP | 2004-166840 | 6/2004 |
| JP | 2008-142829 A | 6/2008 |

OTHER PUBLICATIONS

Korean Decision to Grant dated Feb. 2, 2015 issued in corresponding Korean Application No 10-2009-0002919 (with English translation).
(Continued)

*Primary Examiner* — William C Joyce
(74) *Attorney, Agent, or Firm* — Harness, Dickey & Pierce, P.L.C.

(57) ABSTRACT

A robot capable of communicating according to a gesture may include a plurality of link members, and an outer cover member surrounding the plurality of link members. The shape of the outer cover member is varied into a curved shape, when the outer cover member is adhered closely to the plurality of link members, according to the variation of the shapes of the plurality of link members.

8 Claims, 5 Drawing Sheets

(51) Int. Cl.
*B25J 9/10* (2006.01)
*B25J 19/06* (2006.01)
*B25J 18/00* (2006.01)

(52) U.S. Cl.
CPC .............. *B25J 19/06* (2013.01); *Y10S 901/27* (2013.01); *Y10T 74/20329* (2015.01)

(58) Field of Classification Search
USPC .............. 74/490.01, 490.03, 490.04, 490.05; 294/111; 600/121; 901/49; 180/6.2
See application file for complete search history.

(56) References Cited

U.S. PATENT DOCUMENTS

| | | | |
|---|---|---|---|
| 4,494,417 A | 1/1985 | Larson et al. | |
| 4,848,179 A | 7/1989 | Ubhayakar | |
| 5,062,855 A | 11/1991 | Rincoe | |
| 5,337,734 A | 8/1994 | Saab | |
| 5,386,816 A | 2/1995 | Inoue et al. | |
| 5,406,939 A | 4/1995 | Bala | |
| 5,514,074 A | 5/1996 | Yabe et al. | |
| 5,704,899 A | 1/1998 | Milo | |
| 6,247,738 B1 | 6/2001 | Winkel et al. | |
| 6,543,307 B2 * | 4/2003 | Ambrose ............. | B25J 19/0025 74/490.01 |
| 6,733,440 B2 | 5/2004 | Ailinger et al. | |
| 7,361,197 B2 | 4/2008 | Winfrey | |
| 7,665,893 B2 | 2/2010 | Buchalter | |
| 7,811,277 B2 | 10/2010 | Boulais | |
| 7,955,042 B2 | 6/2011 | Sugahara et al. | |
| 2002/0144565 A1 | 10/2002 | Ambrose | |
| 2005/0177025 A1 | 8/2005 | Jaker et al. | |
| 2007/0043259 A1 | 2/2007 | Jaffe et al. | |
| 2008/0294007 A1 | 11/2008 | Takada | |

OTHER PUBLICATIONS

U.S. Office Action mailed May 22, 2012 in copending U.S. Appl. No. 12/654,531.
U.S. Final Office Action mailed Jan. 25, 2013 in copending U.S. Appl. No. 12/654,531.
U.S. Advisory Action mailed Mar. 19, 2013 in copending U.S. Appl. No. 12/654,531.
U.S. Office Action mailed May 6, 2013 in copending U.S. Appl. No. 12/654,531.
U.S. Final Office Action mailed Sep. 20, 2013 in copending U.S. Appl. No. 12/654,531.
U.S. Advisory Action mailed Dec. 31, 2013 in copending U.S. Appl. No. 12/654,531.
U.S. Office Action mailed Feb. 28, 2014 in copending U.S. Appl. No. 12/654,531.
U.S. Appl. No. 12/654,531, filed Dec. 22, 2009, Hon Won Kim, Samsung Electronics Co., Ltd.
Final Office Action, dated Sep. 20, 2013, in corresponding U.S. Appl. No. 12/654,531.
Advisory Action, dated Dec. 31, 2013, in corresponding U.S. Appl. No. 12/654,531.
Office Action, dated Feb. 28, 2014, in corresponding U.S. Appl. No. 12/654,531.
Final Office Action, dated Oct. 29, 2014, in corresponding U.S. Appl. No. 12/654,531.
Korean Office Action dated Nov. 26, 2014 issued in corresponding Korean Application No. 10-2009-0002919 (with English translation).

* cited by examiner

ROBOT

CROSS-REFERENCE TO RELATED APPLICATIONS

This application is a divisional application of U.S. patent application Ser. No. 12/654,531, filed Dec. 22, 2009, and is related to and claims the priority benefit of Korean Patent Application No. 10-2009-0002919, filed on Jan. 14, 2009, in the Korean Intellectual Property Office, the disclosures of which are incorporated herein by reference.

BACKGROUND

1. Field

Embodiments of the present invention relate to a robot, which communicates with a gesture.

2. Description of the Related Art

Due to recent develops in robotic engineering, robots increasingly are communicating with humans. Various techniques for nonverbal communication between robots and humans have been developed.

One example of such nonverbal communication is a gesture. A gesture refers to the motion of a body or a hand, which is used to provide added effect to a conversation. In this way, a robot expresses feelings and state of mind.

However, a robot generally includes links and joints, and thus, has limited ability to make gestures. That is, if the robot can achieve a curved shape, the robot easily makes the gesture. However, the curved shape is not easily achieved with the links and the joints, and thus it is difficult to make a gesture.

Further, when the robot includes plural links and joints to achieve a curved shape, it is difficult to control the motion, due to the increase in the number of the links and joints. Moreover, the curved shaped obtained with the plural links and joints does not have a natural appearance, and thus the expression of the feeling or state of mind of the robot does not look natural.

SUMMARY

Therefore, it is an aspect of the present invention to provide a robot, in which an outer cover member is added to a body including links and joints to make a gesture.

Additional aspects of the invention will be set forth in part in the description which follows and, in part, will be apparent from the description, or may be learned by practice of the invention.

The foregoing and/or other aspects of the present invention are achieved by providing a robot including a plurality of link members, and an outer cover member surrounding the plurality of link members, wherein a shape of the outer cover member is varied according to variation in the shapes of the plurality of link members.

The shape of the outer cover member may be varied into a curved shape. The outer cover member may be made of a flexible and elastic material. The plurality of link members may include at least three link members. The outer cover member may be fixed to both ends of the plurality of link members. One end of the outer cover member may be opened, and the outer cover member may receive the plurality of link members through the opened end.

The foregoing and/or others aspect of the present invention are also achieved by providing a robot including a plurality of link members, and an outer cover member surrounding the plurality of link members, wherein the outer cover member is fixed to both ends of the plurality of link members, and the shape of the outer cover member is varied to correspond to the variations of the shapes of the plurality of link members.

The shape of the outer cover member may be varied into a curved shape. The outer cover member may be made of a flexible and elastic material. The shape of the outer cover member may be varied under the condition that the outer cover member is adhered closely to the plurality of link members.

The foregoing and/or other aspects of the present invention are also achieved by providing a robot including a body having a plurality of link members, and an outer cover member surrounding the plurality of link members, wherein the body is varied into a streamlined shape according to the variation of the outer cover member into a curved shape due to the variations of the shapes of the plurality of link members.

The body may be varied into a wave shape. The body may be varied into a twisted shape

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION OF EMBODIMENTS

Figure 1:
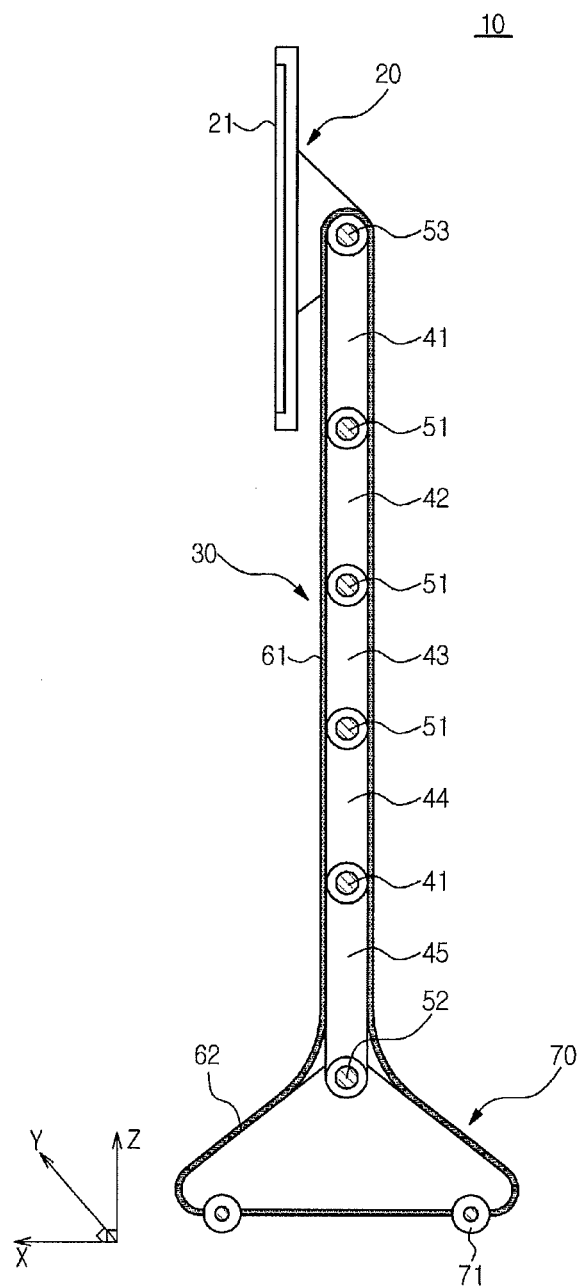
FIG. 1 is a view illustrating a robot in accordance with an embodiment of the present invention in a state in which the robot makes no gesture.

Reference will now be made in detail to the embodiments, examples of which are illustrated in the accompanying drawings, wherein like reference numerals refer to the like elements throughout. The embodiments are described below to explain the present invention by referring to the figures.

Figure 2:
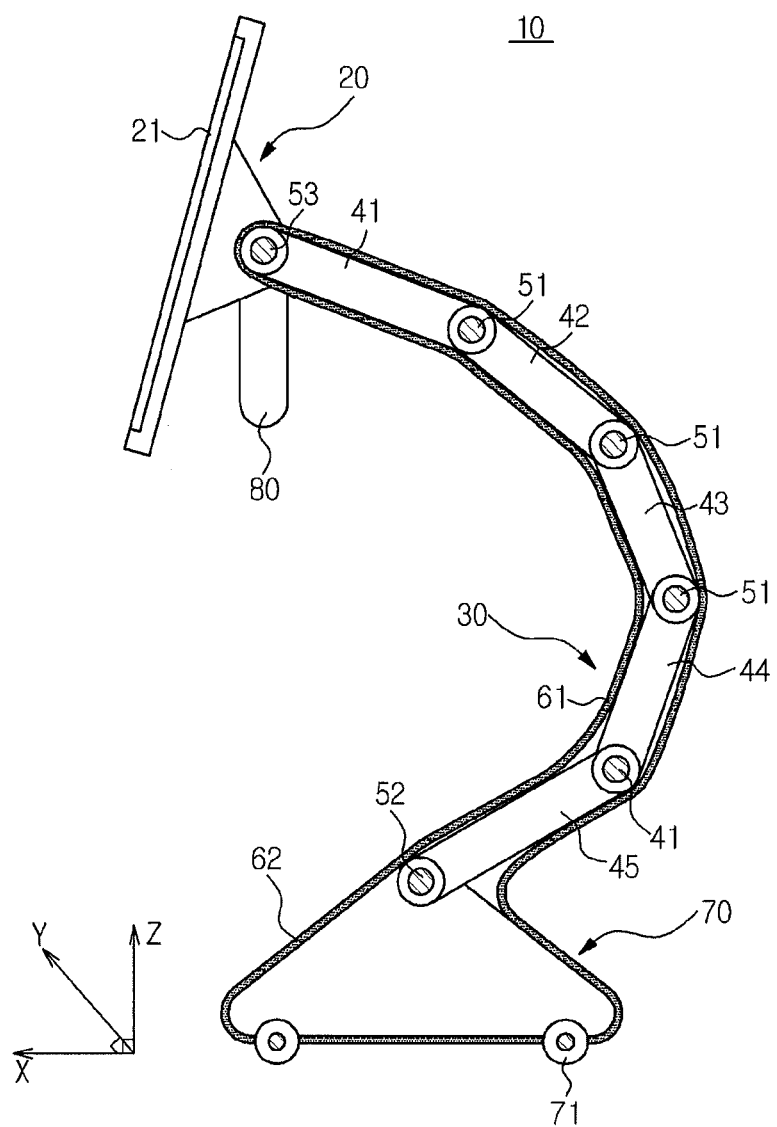
FIG. 2 is a view illustrating the robot in accordance with the embodiment of the present invention in a state in which the robot makes a gesture.

FIG. 1 is a view illustrating a robot in accordance with an embodiment of the present invention in a state in which the robot makes no gesture, and FIG. 2 is a view illustrating the robot in accordance with the embodiment of the present invention in a state in which the robot makes a gesture.

As shown in FIGS. 1 and 2, a robot 10 in accordance with this embodiment of the present invention is capable of making a gesture. If the robot 10 has a streamlined shape, the robot 10 may make a gesture simply with the shape. Here, the streamlined shape means that the curved shape of the robot 10 is natural so that a human recognizes the expression of the feeling or state of mind of the robot 10 during a process of nonverbal communication between the robot 10 and the human.

The robot 10 includes a head 20, a body 30, arms 80, and a support 70. Particularly, the robot 10 changes the body 30 into a streamlined shape, and thus makes a gesture.

The body 30 includes a plurality of link members 41-45. The plural link members 41-45 include a first link member 41, a second link member 42, a third link member 43, a fourth link member 44, and a fifth link member 45. Each of the plural link members 41-45 has a rectilinear shape.

The body 30 further includes spinal joints 51 installed among the plural link members 41-45. The spinal joints 51 are rotated in two perpendicular directions. The plural link members 41-45 are respectively rotated in the X direction or the Y direction by the spinal joints 51. Therefore, the shape of the body 30 is varied by the rotation of the plural link members 41-45. However, since the plural link members 41-45 have a rectilinear shape, although the shapes of the plural link members 41-45 are varied, the body 30 has difficulty in having a natural curved shape. Particularly, when the plural link members 41-45 respectively have designated lengths and the number of the joints 51 installed among the link members 41~45 is limited, the body 30 has greater difficulty in having a natural curved shape.

Therefore, the body 30 further includes an outer cover member 61 surrounding the plural link members 41-45. The outer cover member 61 is made of a flexible and elastic material. The shape of the outer cover member 61 may be varied according to the variation of the shape of the plural link members 41-45. Further, since the shape of the outer cover member 61 is varied when the outer cover member 61 is adhered closely to the plural link members 41-45, the shape of the outer cover member 61 is substantially the same as the shape of the plural link members 41-45. Moreover, in view of the property of the material of the outer cover member 61, the outer cover member 61 has a natural curved shape when the shape of the outer cover member 61 is varied. Thereby, the body 30 makes a natural curved shape due to the outer cover member 61, and thus the robot 10 can make a gesture using the body 30.

The support 70 is movably provided to support the body 30. The support 70 is connected to the body 30 by a lower joint 52, and more particularly, the fifth link member 45 out of the plural link members 41-45 and the support 70 are connected by the lower joint 52. The support 70 includes wheels 71 and driving devices (not shown) to drive the wheels 71, and thus allows the robot 10 to move.

The head 20 is supported by the body 30. The head 20 is connected to the body 30 by an upper joint 53, and more particularly, the first link member 41 out of the plural link members 41-45 and the head 20 are connected by the upper joint 53. Further, the head 20 includes a display device 21 to display data, and a user recognizes the data displayed by the robot 10 through the display device 21. The head 20 is capable of expressing a gesture together with the body 30.

The arms 80 are supported by the body 30. The arms 80 are connected to the body 30 by shoulder joints (not shown), and more particularly, the first link member 41 out of the plural link members 41-45 and the arms 80 are connected by the shoulder joints (not shown). Further, the arms 80 are capable of expressing a gesture together with the body 30.

The support 70 may be surrounded by a second outer cover member 62. The second outer cover member 62 surrounding the support 70 may be formed integrally with the outer cover member 61 surrounding the plural link members 41-45, or may be formed separately from the outer cover member 61. Further, the head 20 the arms 80 may be respectively surrounded by separate outer cover members.

If the second outer cover member 62 surrounding the support 70 is formed integrally with the outer cover member 61 surrounding the plural link members 41-45, the lower end of the outer cover member 61 is fixed to the support 70 by the second cover member 61 surrounding the support 70, and the upper end of the outer cover member 61 is fixed to the upper end of the first link member 41.

Figure 3:
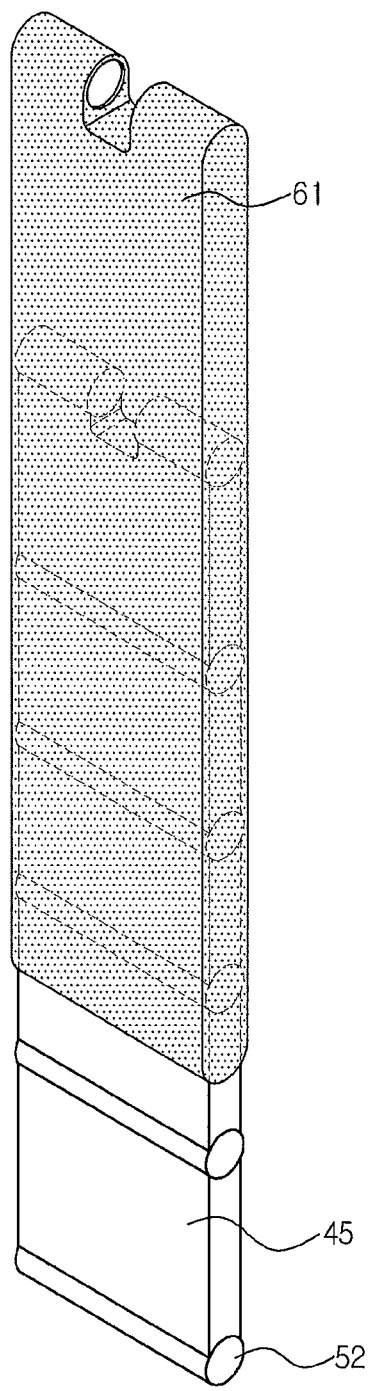
FIG. 3 is a perspective view illustrating a body of the robot in accordance with the embodiment of the present invention.

FIG. 3 is a perspective view illustrating the body of the robot in accordance with the embodiment of the present invention.

As shown in FIG. 3, the outer cover member 61 surrounding the plural link members 41-45 may be formed separately from the second outer cover member 62 surrounding other parts except for the plural link members 41-45. Since the upper end of the outer cover member 61 is partially opened and the lower end of the outer cover member 61 is fully opened, the plural link members 41-45 are inserted into the outer cover member 61 through the opened lower end of the outer cover member 61. In this case, the lower end of the outer cover member 61 is fixed to the lower end of the fifth link member 45, and the upper end of the outer cover member 61 is fixed to the upper end of the first link member 41. Here, in order to fix the outer cover member 61 to the lower end of the fifth link member 45, various methods including a screw connection method may be used.

The reason why the outer cover member 61 is fixed to both ends of the plural link members 41-45 is that the outer cover member 61 has a more natural curved shape and thus the body 30 has a naturally curved shape. That is, if the outer cover member 61 is fixed to the second link member 42, the third link member 43, and the fourth link member 44 out of the plural link members 41-45, the natural curved shape of the outer cover member 61 may be deformed due to the fixed portions.

Figure 4:
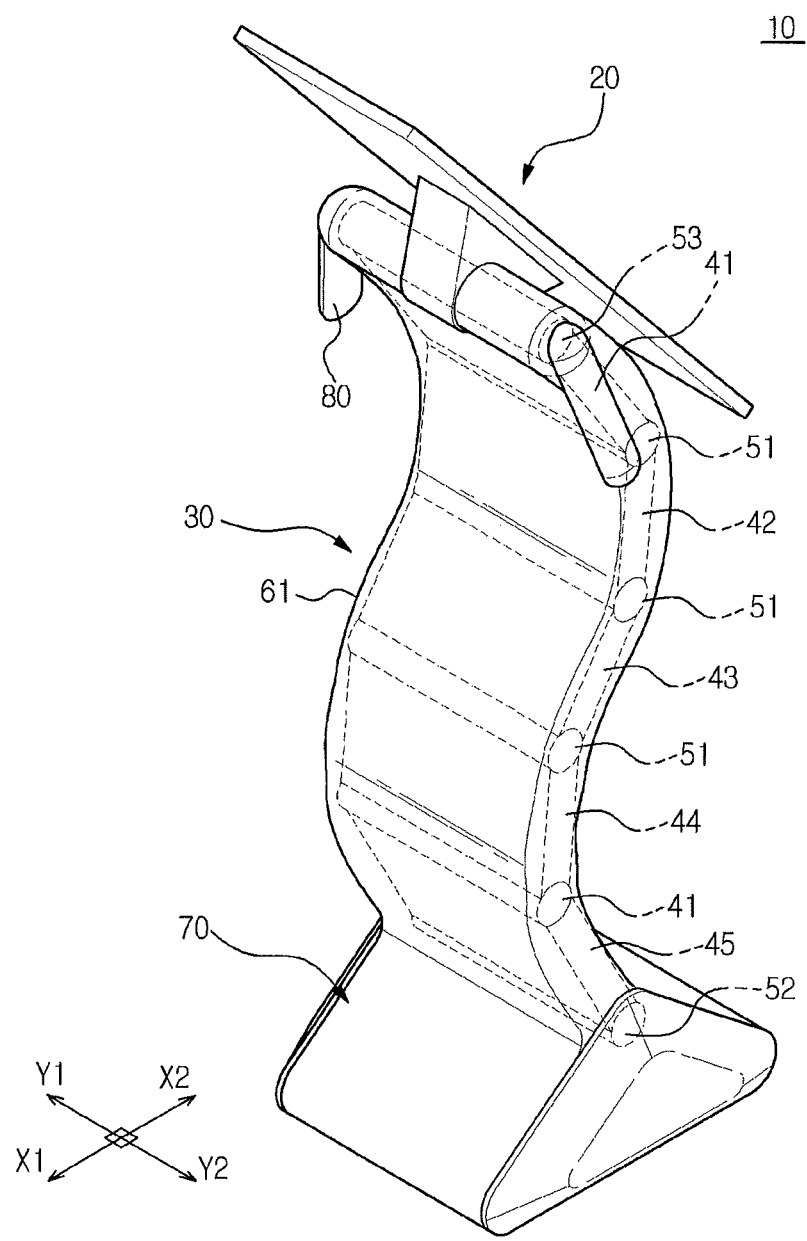
FIGS. 4 and 5 are views respectively illustrating gestures made by the robot in accordance with the embodiment of the present invention.
Figure 5:
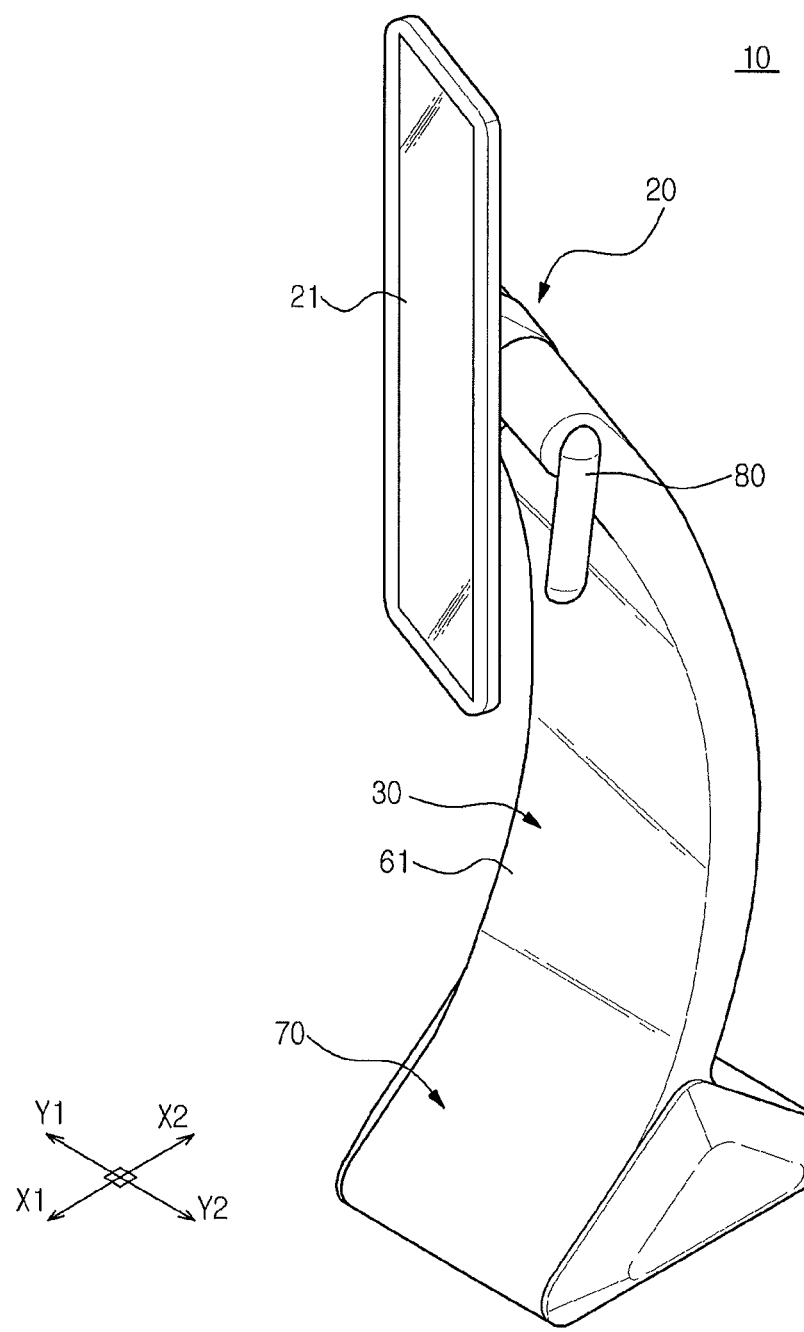

Hereinafter, an operation of the robot making a gesture in accordance with the embodiment of the present invention will be described in detail. FIGS. 4 and 5 are views respectively illustrating gestures made by the robot in accordance with the embodiment of the present invention. As shown in FIGS. 4 and 5, the robot 10 in accordance with the embodiment of the present invention makes various gestures.

FIG. 4 illustrates the body 30 in a wave shape. The plural link members 41-45 are respectively rotated in the X1 direction or the X2 direction, and thus the upper portion of the body 30 is bent in the X1 direction and the lower portion of the body 30 is bent in the X2 direction. As described above, the overall shape of the plural link members 41-45 is varied according to the rotation of the plural link members 41-45 in the X direction, and thus the shape of the outer cover member 61 surrounding the plural link members 41-45 is varied. At this time, since the outer cover member 61 is varied into a naturally curved shape, the body 30 may make the wave shape. Consequently, the robot 10 makes a gesture, such as a wave, and thus may communicate nonverbally with a human. Moreover, the robot 10 may make additional gestures using the arms 80 and the head 20.

FIG. 5 illustrates the body 30 expressed in a twisted shape. The plural link members 41-45 are respectively rotated at different angles in the Y1 direction and thus the body 30 is twisted in the Y1 direction, and simultaneously, the plural link members 41-45 are respectively rotated in the X1 direction or the X2 direction and thus the body 30 is bent in the X1 direction. As described above, the overall shape of the plural link members 41-45 is varied according to the rotation of the plural link members 41-45 in the X direction and the Y direction, and thus the shape of the outer cover member 61 surrounding the plural link members 41-45 is varied. At this time, since the outer cover member 61 is varied into a natural curved shape, the body 30 may naturally express the twisted shape. Consequently, the robot 10 makes a gesture, such as a twist, and thus may communicate nonverbally with a human. Moreover, the robot 10 may make additional gestures using the arms 80 and the head 20.

As is apparent from the above description, in accordance with the embodiment of the present invention, the robot including links and joints makes a natural curved line using an outer cover member, thus achieving the expression of the feeling and state of mind of the robot through nonverbal communication.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A robot comprising:
 a head, the head configured to pivot when the robot conveys one or more gestures to a user;
 a body connected to the head, the body including a plurality of link members, each link member being configured to rotate separately about spinal joints such that the body can pivot in at least two directions;
 a pair of arms protruding from the body, the pair of arms connected to the body via shoulder joints, the pair of arms configured to move in a waving motion when the robot conveys one or more of the gestures to the user;
 a support connected to the body, the support including wheels and a driving device, the driving device configured to drive the wheels to move the body;
 a first outer cover member surrounding the plurality of link members, the first outer cover member including a material that is flexible and elastic such that a shape of the first outer cover member varies according to variation in a shape of the plurality of link members when the robot conveys one or more of the gestures to the user; and
 a second outer cover member surrounding the support.

2. The robot according to claim 1, wherein the shape of the first outer cover member varies into a curved shape.

3. The robot according to claim 1, wherein the plurality of link members include at least three link members.

4. The robot according to claim 1, wherein each of the plurality of link members have a rectilinear shape.

5. A robot comprising:
 a head, the head configured to pivot when the robot conveys one or more gestures to a user;
 a body connected to the head, the body including a plurality of link members, each link member being configured to rotate separately about spinal joints such that the body can pivot in at least two directions;
 a pair of arms protruding from the body, the pair of arms connected to the body via shoulder joints, the pair of arms configured to move in a waving motion when the robot conveys one or more of the gestures to the user;
 a support connected to the body, the support including wheels and a driving device, the driving device configured to drive the wheels to move the body;
 a first outer cover member surrounding the plurality of link members, the first outer cover member including a material that is flexible and elastic such that a shape of the first outer cover member varies according to variations in a shape of the plurality of link members when the robot conveys one or more of the gestures to the user; and
 a second outer cover member surrounding the support, wherein
  the second outer cover member is formed integrally with the first outer cover member such that a lower end of the first outer cover member is fixed to the support by the second outer cover member, and
  an upper end of the first outer cover member is fixed to an upper end of a first link member near the head.

6. The robot according to claim 5, wherein the shape of the first outer cover member is varied into a curved shape.

7. The robot according to claim 5, wherein the first outer cover member is adhered closely to the plurality of link members.

8. The robot according to claim 5, wherein each of the plurality of link members have a rectilinear shape.

* * * * *